United States Patent [19]
Raz

[11] Patent Number: 5,906,658
[45] Date of Patent: May 25, 1999

[54] MESSAGE QUEUING ON A DATA STORAGE SYSTEM UTILIZING MESSAGE QUEUING IN INTENDED RECIPIENT'S QUEUE

[75] Inventor: Yoav Raz, Newton, Mass.

[73] Assignee: EMC Corporation, Hopkinton, Mass.

[21] Appl. No.: 08/616,486

[22] Filed: Mar. 19, 1996

[51] Int. Cl.$^6$ .............................. G06F 13/14; G06F 13/20
[52] U.S. Cl. .............................. 710/39; 711/147; 711/153
[58] Field of Search .................................... 711/153, 147; 395/292, 307, 478, 497.01, 859; 710/39

[56] References Cited

U.S. PATENT DOCUMENTS

| | | | |
|---|---|---|---|
| 4,674,033 | 6/1987 | Miller | 364/200 |
| 4,713,758 | 12/1987 | De Kelaita et al. | 364/200 |
| 4,715,030 | 12/1987 | Koch et al. | 370/85 |
| 5,222,217 | 6/1993 | Blount et al. | 395/325 |
| 5,428,781 | 6/1995 | Duault et al. | 395/650 |
| 5,485,586 | 1/1996 | Brash et al. | 395/292 |
| 5,493,566 | 2/1996 | Ljungberg et al. | 370/60 |
| 5,541,912 | 7/1996 | Choudhury et al. | 370/17 |
| 5,555,396 | 9/1996 | Alferness et al. | 395/474 |
| 5,644,575 | 7/1997 | McDaniel | 370/416 |

Primary Examiner—Thomas C. Lee
Assistant Examiner—Rehana Perveen
Attorney, Agent, or Firm—Fish & Richardson P.C.

[57] ABSTRACT

A method of transferring messages between a plurality of processes that are communicating with a data storage system, wherein the plurality of processes access the data storage system by using I/O services. the method includes the steps of configuring the data storage system to provide a shared data storage area for the plurality of processes, wherein each of the processes is permitted to access the shared data storage region; when a sending process sends a new message that is intended for a recipient process, sending that new message to the data storage system; storing that new message in the shared data storage region; in response to an action initiated by the intended recipient process, retrieving that new message from the shared data storage region; and further in response to the action initiated by the intended recipient process, sending the retrieved message to the intended recipient process, wherein the sending and intended recipient processes are among the plurality of processes.

6 Claims, 3 Drawing Sheets

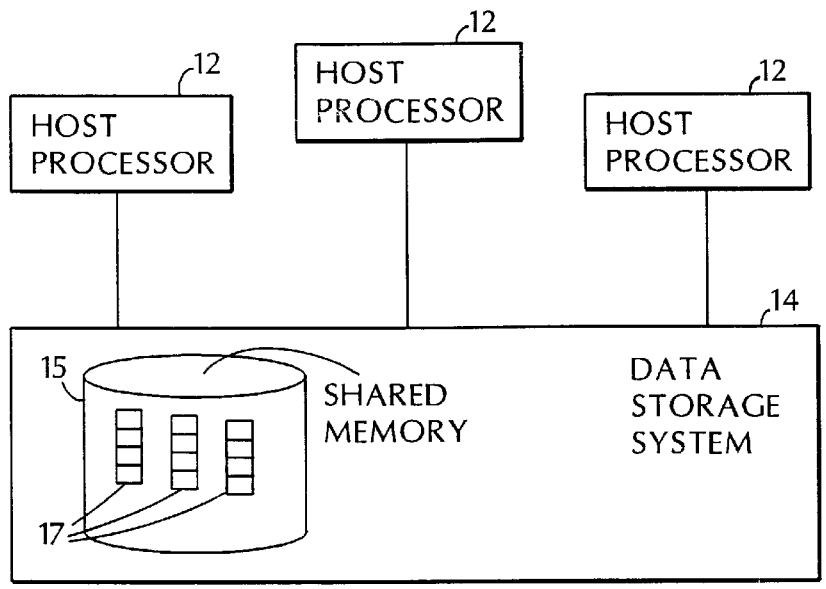
FIG. 1
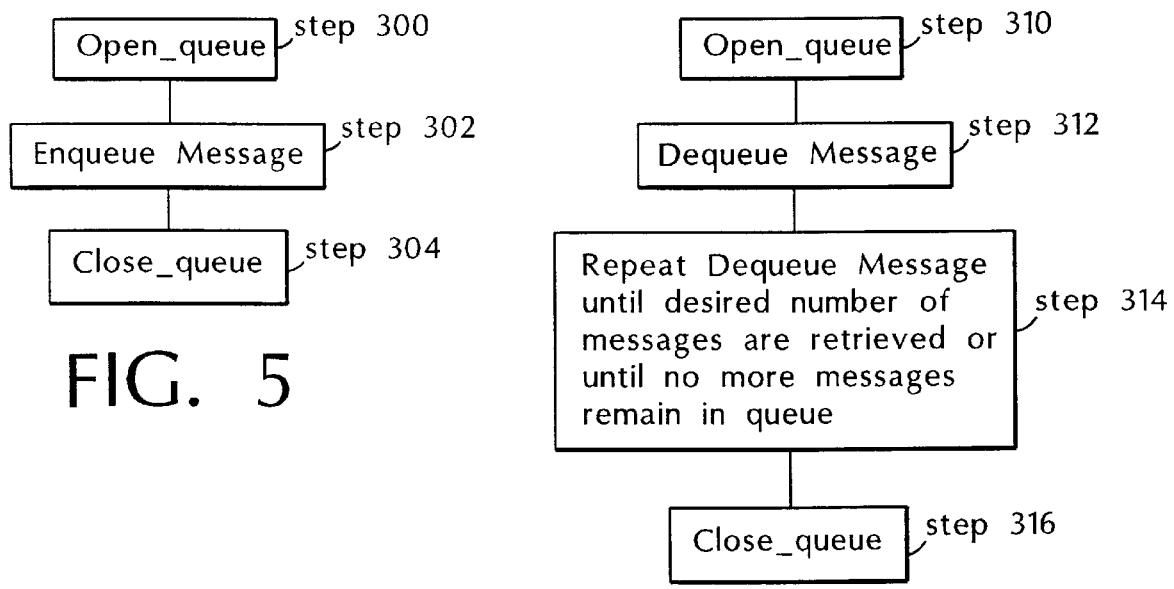
FIG. 5
FIG. 6

MESSAGE QUEUING ON A DATA STORAGE SYSTEM UTILIZING MESSAGE QUEUING IN INTENDED RECIPIENT'S QUEUE

BACKGROUND OF THE INVENTION

The invention relates generally to messaging between host processors and/or processes.

An increasing number of powerful data storage systems are becoming commercially available. These systems are capable of storing and rapidly accessing hundreds of gigabytes, even terabytes, of data. The Symmetrix 3XXX and 5XXX Series data storage systems that are sold by EMC, Corp. of Hopkinton, Mass. are good examples of these new, high performance data storage systems. The Symmetrix data storage systems, which are frequently used for online transaction processing and other response-intensive applications, are part of a group of data storage systems that are more generally referred to as integrated cached disk array systems. Such systems include a large array of small disk storage devices and a large cache memory. For example, in the disk array there may be as many as 128 5.24 inch disk storage devices each with its own cache buffer and the total cache can be above 4 Gigabytes. The cache is made up of high speed storage units which collectively are used as an intermediary between the host processors that are connected to the data storage system and the internal storage disks of the disk array. Internally, a plurality of microprocessors (e.g. up to 144 individual microprocessors) handle accesses to the cache and the disks of the disk array. Thus, a high degree of parallelism and thus efficiency is possible in processing I/O tasks.

These systems are based on the principle that currently active data at any given time is relatively small in comparison to the total amount of data that is stored in the system and thus the currently active data is stored in the cache where it can be accessed very quickly. Because access times for reading and writing to cache are much shorter than for disks, storing active data in cache memory results in a substantial improvement in performance.

Such systems use various other techniques to enhance performance and reliability. For example, in the Symmetrix data storage systems, the cache has a separate power supply with battery backup so that a power failure to the main system will not result in loss of data in the cache. Also those systems include a mirroring facility to generate a duplicate of all stored data. In accordance with mirroring, the data storage system generates two copies of data in the disk array, each copy on a different set of the disks. When writes occur to data in the system, both copies are updated. Thus, if one disk fails wiping out all of the data stored on that disk, a duplicate of that data can be found and accessed on another disk.

Today's data storage systems, exemplified by the Symmetrix data storage systems of EMC, Corp., make possible further advances in overall system design and performance, such as the present invention described below.

SUMMARY OF THE INVENTION

In accordance with one aspect of the invention, the communication mechanism between processors or processes is the data storage system itself. Two main services are provided to support the communication channel. One service, referred to as an enqueue instruction, allows a process to send a message to a queue and the other service, referred to as a dequeue instruction, enables a process to retrieve a message from a queue.

In general, in one aspect, the invention is a method of transferring messages between a plurality of processes that are communicating with a data storage system, wherein the plurality of processes access the data storage system by using I/O services. The method includes the steps of configuring the data storage system to provide a shared data storage area for the plurality of processes, wherein each of the plurality of processes is permitted to access the shared data storage region; when a sending process sends a new message that is intended for a recipient process, sending that new message to the data storage system; storing that new message in the shared data storage region; in response to an action initiated by the intended recipient process, retrieving the new message from the shared data storage region; and further in response to the action initiated by the intended recipient process, sending the retrieved message to the intended recipient process, wherein the sending and intended recipient processes are among the plurality of processes.

In general, in another aspect, the invention is a method of transferring messages between a plurality of processors that are connected to a data storage system, wherein the plurality of processors access the data storage system by performing I/O services. The method including the steps of configuring the data storage system to provide a shared data storage area for the plurality of processors, wherein each of the processors is permitted to access the shared data storage region; establishing a plurality of queues within the shared data storage region, each of the queues for storing messages that are received from the plurality of processors; when a sending processor sends a new message intended for an intended recipient processor, sending that new message to the data storage system; and enqueuing that new message in an intended recipient's queue, wherein the intended recipient's queue is one of the plurality of queues, and wherein the sending and intended recipient processors are among the plurality of processors.

In preferred embodiments, the method further includes the steps of dequeuing a message from the intended recipient's queue which contains one or more enqueued messages one of which is the new message; and sending the dequeued message to the intended recipient processor.

In general, in yet another aspect, the invention is a messaging system including a data storage system; at least one host processor connected to the data storage system, wherein that host processor uses I/O services to send data to and retrieve data from the data storage system, wherein the data storage system is configured to provide a data storage area and wherein that data storage system comprises a plurality of queues within the storage area for holding messages sent by processes running on the host processor. The messaging system also includes means for enabling a process running on the host processor to enqueue a message in a selectable one of the queues; and means for enabling another process to dequeue an enqueued messages from a predetermined one of the queues.

In preferred embodiments, the data storage system includes cache memory and disk memory and the shared storage area is implemented in the cache memory.

One advantage of the invention is that it avoids the need for direct interhost communications. All communication between host processors can be handled through the queues that are implemented within the cache memory of the data storage system. That is, the host processors communicate with each other through the I/O interface to the data storage system. This results in much higher bandwidth than is typically available through conventional interprocessor communications channels. In addition, since both the cache and the disks are protected, the communication is reliable.

Other advantages and features will become apparent from the following description of the preferred embodiment and from the claims.

BRIEF DESCRIPTION OF THE DRAWINGS

FIG. 1 is a block diagram of a multi-processor system which includes a plurality of processors connected to a data storage system;

FIG. 5 shows a typical sequence of steps for adding a message a queue; and

FIG. 6 shows a typical sequence of steps for retrieving a message from a queue.

DESCRIPTION OF THE PREFERRED EMBODIMENTS

Referring to FIG. 1, a system which embodies the invention includes a plurality of host processors 12 that are connected to a central data storage system 14. Host processors 12 are digital processing units which include one or more CPU's and main memory. They might be, for example, PC's, workstations, symmetric multiprocessors (SMPs) or a massively parallel processor (MPP), which has many CPU's. Their number can range from only two processors to many more than that. Regardless of their number, the principles of operation which are described below would be the same.

In general, data storage system 14 contains a set of queues 15 that are maintained in a portion of shared memory 17 that is accessible to all of the host processors that are connected to the system. Each of the queues in shared memory may be owned by a different one of the processes running on the host processors or by a different one of the host processors. Host processors 12 communicate with each other by sending messages to the queue that belongs to the intended recipient host processor. And host processors 12 receive messages by retrieving messages from their queues.

With this general overview, a more detailed description of the data storage system, the queues, and the services which support the queues will now be presented.

Figure 2:
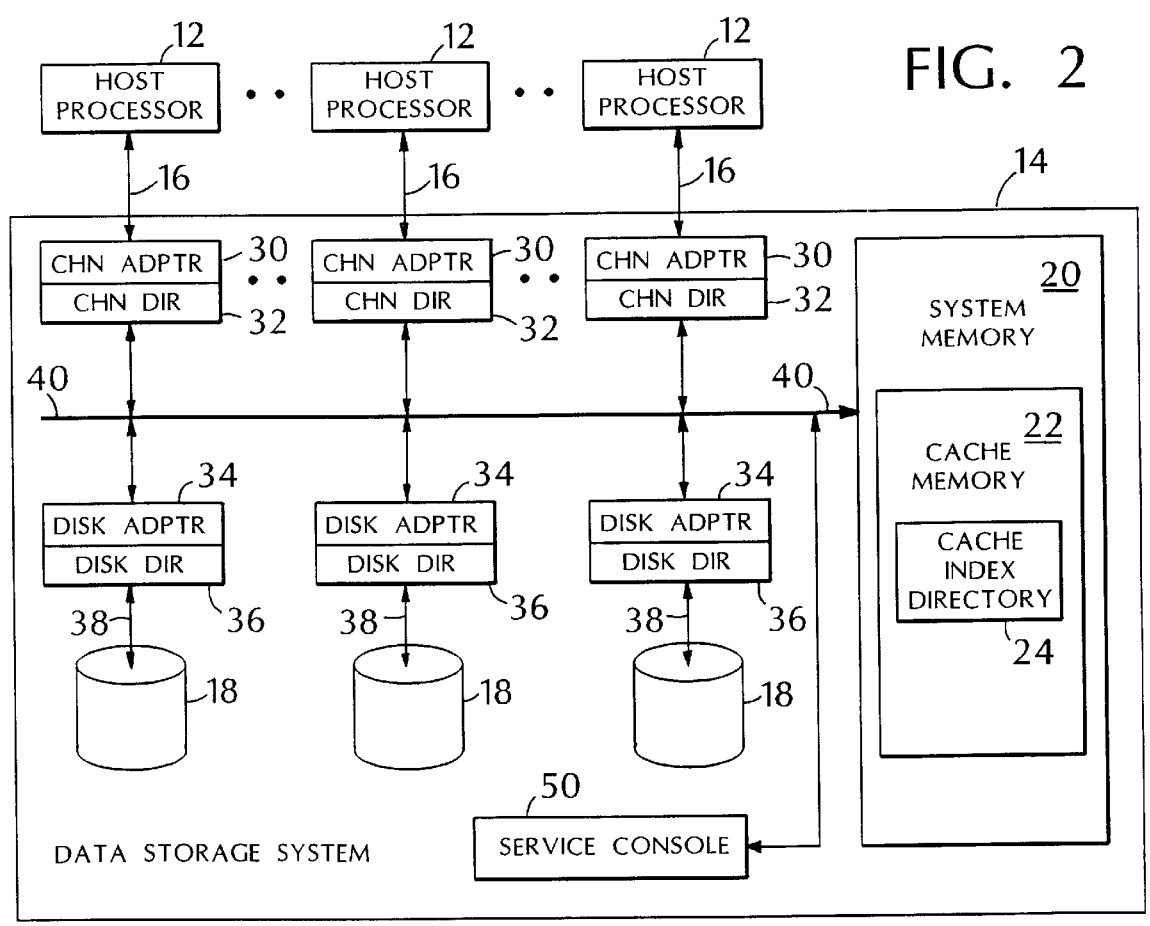
FIG. 2 is a more detailed block diagram of the system shown in FIG. 1.

Referring to FIG. 2, host processors 12 are each connected to data storage system 14 through respective host connections 16. To simplify the discussion, only a single host connection is shown for each host processor. It should be understood, however, that there could in fact be multiple connections between the data storage system and a processor.

Data storage system 14 contains the physical memory in which data is stored. The particular manner in which the physical memory within storage system is implemented and how it is partitioned is not of central importance. Examples of commercially available products that can be used to implement data storage system 14 are the Symmetrix 5XXX™ series family of products from EMC Corporation of Hopkinton, Mass., which are high performance integrated cache disk arrays designed for online data storage. The following details about the internal structure and operation of data storage system 14 generally apply to the Symmetrix™ data storage systems. However, it should be understood that other designs known to persons skilled in the art may also be used to implement data storage system 14.

Data storage system 14 includes multiple arrays of disk devices 18 and a system memory 20. A portion of system memory implements cache memory 22. The multiple arrays of disk devices 18 provide a non-volatile data storage area and cache memory 22 provides a volatile data storage area. Each disk device 18 includes a head-disk assembly, a microprocessor, and a data buffer which enables the data storage system to provide for parallel processing of data. In the described embodiment, system memory 20 is implemented by high-speed random-access semiconductor memory. Within cache memory 22 there is a cache index directory 24 which provides an indication of what data is stored in cache memory 22 and the address of that data in cache memory 22. Cache index directory 24 is organized as a hierarchy of tables for devices, cylinders, and tracks of data records, as further described in U.S. Pat. No. 5,206,939, issued Apr. 27, 1993, and incorporated herein by reference.

There is a group of channel adapters 30 and channel directors 32 that provide interfaces through which host processors 12 connect to data storage system 14. Each channel adapter 30 provides for direct attachment to the physical host connections. Channel director 32 contains a microprocessor that processes commands and data from host processors 12 and manages accesses to cache memory 22. Channel director 32 handles I/O requests from host processors 12. It uses cache index directory 24 which is stored in cache memory 22 to determine whether the request can be satisfied out of the cache or whether the data must be obtained from disk devices 18. It maintains data in cache memory based on the data access patterns. Channel directors 32 write data from host processors 12 into cache memory 22 and update cache index directory 24. They also access cache index directory 24 and read data from cache memory 22 for transfer to host processors 12.

There is also a disk adapter 34 and a disk director 36 through which each disk device array 18 is connected to cache memory 22. Disk adapter 34 interfaces to multiple SCSI buses 38 to which disk device arrays 18 are connected. Disk director 36 manages accesses to the disks within disk device arrays 18. Disk Director 36 stages data from the disk device arrays to cache memory 22 and it updates cache index directory 24, accordingly. It also de-stages or writes-back data from "written-to" blocks in cache memory 22 to the disk device arrays and again updates cache index directory 24, accordingly.

Disk adapters 34 and channel adapters 30 access system memory 20 through a high-speed, parallel line system bus 40. System memory 20 is implemented by multiple memory boards. Only one access to any given memory board may occur at any given time, however, multiple memory boards may be accessed at the same time to support concurrent operations.

Data storage system 14 can be configured into multiple logical volumes. Typically, a volume corresponds to a single disk device. A service console 50 within data storage system 14 enables the user to configure the data storage, i.e., to define the logical volumes and to specify which logical volumes are accessible through which host connections 16. In the described embodiment, at least one volume is used to implement the message queues, which are described in greater detail below. That logical volume is configured as a shared volume that is accessible through all host connections 16. Host processors 12 communicate with each other through the message queues that are set up within this shared volume.

Note that data storage system 14 also includes additional functionality and features which are typically found in such system. For example, data storage system 14 also includes a lock manager which coordinates write accesses to logical volumes. Because such functionality and features are known to persons skilled in the art they will not be described here.

Figure 3:
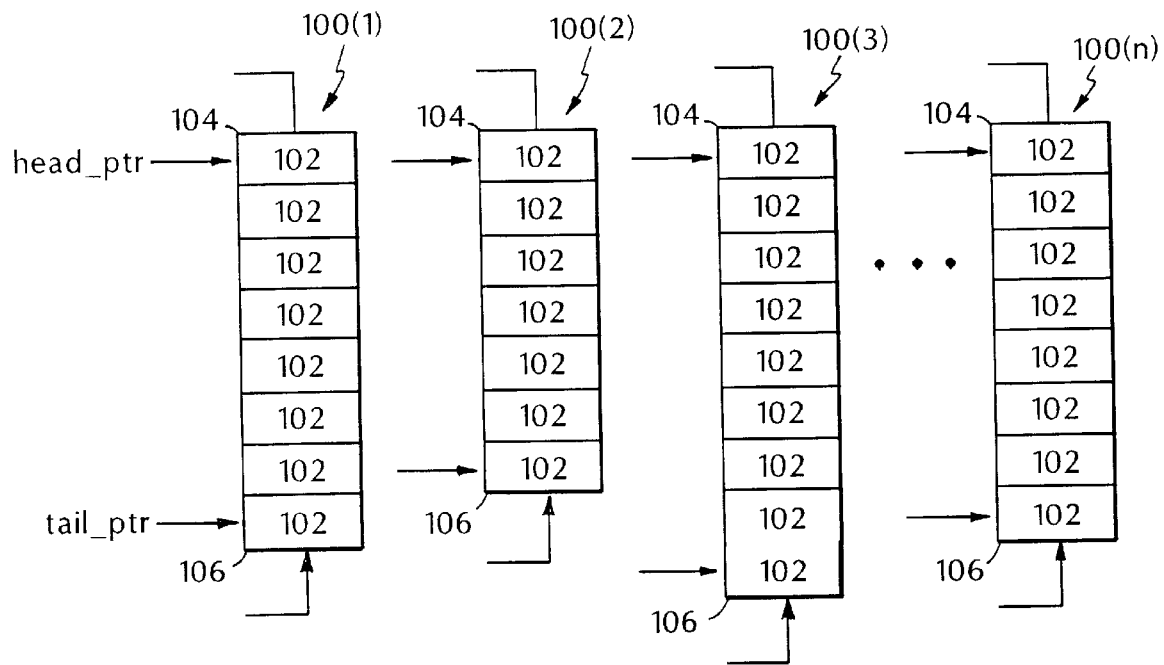
FIG. 3 is a schematic representation of the message queues that are implemented in the data storage system of FIG. 1.

The Oueues:

Referring to FIG. 3, in accordance with the invention, a set of queues 100(1) through 100(n) (referred to generally as queues 100) are created in the shared volume in data storage system 14. Queues 100 and the services which support them provide a mechanism for asynchronous messaging between host processors.

Each queue 100($i$) is a collection of records 102, each of which represents a message. The number of records or messages ranges from zero for an empty queue to some maximum number determined by the maximum capacity of the particular queue as specified when the queue was created. Accesses to queues 100 are made to a specific record within the collection of records 102. There are two fundamental operations that distinguish a queue from a file. There is one operation (such as the enqueue instruction described below) that is used to add a record to the queue and there is another operation (such as the dequeue instruction described below) that is used to remove a record from the queue. Also, a queue has a head and a tail, which typically define the locations from which a record is removed and to which a record is added.

Referring again to FIG. 3, in the described embodiment, each of the queues 100 is a FIFO queue and it has a head 104, which is the beginning of the queue and a tail 106, which is the end of the queue. In this case, the head is the location from which records are removed from the queue for delivery to the host processor that is accessing the queue and the tail is the location to which records are added to the queue by another host processor. Of course, the opposite could also be true, i.e., records could be added to the head and removed from the tail.

Each message in the queue is terminated by a delimiter (i.e., a special character) which indicates where one record ends and another record begins. When a record is being read from the queue, the read operation (which is invoked by a dequeue instruction described below) continues until a delimiter is detected.

Though the queues in the described embodiment are FIFO queues, the invention is not limited to using only FIFO queues. The queues could be of other types, e.g. priority queues in which messages are read from the queue in an order that is determined by some priority which is assigned to the individual messages in the queue.

Figure 4:
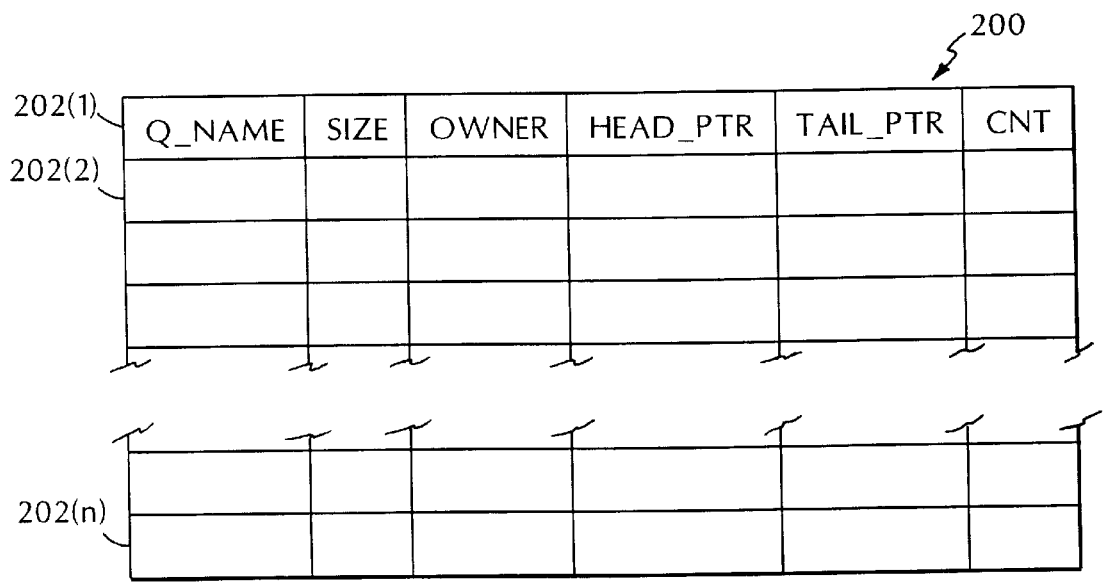
FIG. 4 shows the queue table data structure that describes he qeues.

Referring to FIG. 4, a queue table 200, which is stored and maintained within a protected area of the data storage system, describes the structure of the queues. Queue table 200, which is updated by a regular write operation, includes an entry 202($i$) for each of the queues that is implemented within the data storage system. Each entry 202($i$) has a field which contains the identity of each queue (i.e., q_name) and it has other fields which contain other queue related information. For example, each entry 202($i$) in queue table 200 also has a field for indicating the ownership of the queue (e.g. the identity of the process which created the queue).

Also, for each queue, there is a pointer to the tail of the queue (i.e., tail_ptr) and a pointer to the head of the queue (i.e., head_ptr). In addition, the table also optionally includes a field for storing a count variable (i.e., CNT) which is used to indicate the number of messages that are within the queue. The table further includes a field which contains the size of the queue, i.e., the amount of memory that was allocated to the queue upon its creation, which may be a default value that is the same for all queues or which may be specified at the time the queue is created.

When each host processor boots up or establishes its connection to the data storage system, it accesses and retrieves information from the queue table which is stored in the protected area of the data storage system and it stores the retrieved information locally within its main memory. The form in which it retrieves the information is not of central importance nor is the manner in which it is stored at the host processor level. What is important, however, is that each host processor will possess its own record of the queues that are supported within the data storage system. Thus, the processes running on the host processor will be able to readily determine the identity of the queues that are supported within the data storage system and can use this information when addressing and sending messages to other processors and/or processes via the queues in the data storage system.

Set of Services:

A set of services is provided which support the message queues. They include:

create_queue(q_name, return_code)

destroy_queue(q_name, return_code)

open_queue(q_name, flag)

close_queue(q_name)

enqueue(q_name, buffer, return_code)

dequeue(q_name, buffer, return_code)

The Create_queue Instruction

The create_queue instruction is used to create a new queue. It takes at least two parameters, namely q_name and return_code. When executed, it assigns a group of blocks within the data storage system to form a queue and updates the queue table by adding a new entry for q_name. It also updates the appropriate fields in the new entry by setting the head_ptr and the tail_ptr to both point to the beginning address location of the new empty queue. Optionally, the create_queue can also include parameters which specify the size of the queue, i.e., the maximum number of blocks which the queue can hold, and the owner and/or access rights to the queue. return_code is variable which the system uses to pass back to the host processor an indication of the outcome of executing the create_queue instruction.

The Destroy_queue Instruction

The destroy_queue instruction is used to eliminate a queue after it is no longer needed. It takes at least two parameters, namely q_name and return_code. When executed, it deallocates the portion of memory within the data storage system that was assigned to the queue identified by q_name. It also updates the queue table within the data storage system by clearing the entries for q_name.

The Open_queue Instruction

A process running at the host processor level opens a queue. It may be the process that owns and/or has access to the queue or it may be a user who provides certain parameters that enable read access to a particular queue. The queue can be an exclusive queue which has only a single owner that can gain read access or it can be a shared queue to which many different processes have read access.

The open_queue instruction is issued prior to either an enqueue instruction or a dequeue instruction. It is the first step that must be taken to access the identified queue. The open_queue instruction takes two parameters, namely, q_name and a flag variable. The flag variable indicates whether the open instruction is in preparation for a dequeue operation or an enqueue operation. When the open_queue instruction is executed, the data storage system checks whether the queue is already open and it checks access rights, if such are defined in the queue table. If the queue is already open and is being used by another process, the system uses return_code variable to return an appropriate error code indicating that it was not possible to open the queue for the requesting process and the attempt must be made again later. Assuming that the queue is not in use and the processor has access rights, if the open_queue instruction is in preparation for a dequeue operation, the data storage system initializes a pointer variable to point to the head of the queue which is identified by qname. On the other hand, if the open queue instruction is in preparation for an enqueue operation, the data storage system initializes the pointer variable to the tail of the queue.

The Close_queue Instruction

Before a process can access a particular queue that has been opened by another process, the other process must first close or release the queue. This is done with the close_queue instruction. The one parameter required in this instruction is the identity of the queue being closed.

The Enqueue Instruction

The enqueue instruction is used to add messages to a queue. It takes at least three parameters, namely, q_name, a buffer parameter and a return-code parameter. The buffer parameter identifies an address in memory of the host processor which contains the message that is to be added to the queue. The return_code parameter is a variable which is used to report the outcome of execution of the instruction, e.g. whether it was successful or failed and if it failed an error code indicating the reason for the failure.

The enqueue instruction obtains the message stored in the memory area designated by the buffer parameter and then adds that message to the end of the queue identified by "q_name". When the instruction is executed, the data storage system accesses the queue table to obtain a pointer (i.e., tail_ptr) to the end of the queue that is identified by q_name. Then, it goes to the location identified by tail_ptr and adds the message that was stored in the buffer location to the queue. Before completing execution of the enqueue instruction, the data storage system accesses the queue table and updates it by changing the tail_ptr pointer for the q_name queue to point to the new end of the queue, i.e., the next block after the last message that was added.

The Dequeue Instruction

The dequeue instruction is used to read or retrieve messages from a queue. The dequeue instruction, like the enqueue instruction, also takes at least three parameters, namely, q_name, a buffer parameter and a return-code parameter. In this case, the buffer parameter identifies an address in the memory of the host processor into which the retrieved message from the q_name queue will be stored for use by the host processor. The other parameters are similar to those in the enqueue instruction.

When the dequeue instruction is executed, the data storage system goes to the queue table to locate the head of the appropriate queue, it then goes to that location in memory, reads the first message that is found there, and sends that message to the host processor that issued the dequeue instruction. In other words, the data stroage system reads the contents of the queue until it encounters an end of message indicator. Then, it modifies the head_ptr in the queue table to point to the beginning of the next message in the queue.

These services which support the queues may be layered on top of the regular I/O functionality that is provided within the host processor. In that case, the queue services are simply mapped to those I/O services that are necessary to implement the functionality that was described above. Alternatively, special services can be defined and supported within the data storage system itself. In that case, the instructions, such as enqueue and dequeue, would be passed over the host connection to the data storage system, which would interpret the instruction and then perform the operations necessary to implement the abovedescribed functionality. The latter approach of providing the services within the data storage system might tend to have performance advantages since the amount of traffic that needs to be sent over the host connection would be minimized.

Various different mechanisms can be used to notify the host processor that message are pending in its queue. For example, each host processor might simply poll its queue periodically to determine whether any messages are present. This can be accomplished easily by reading the two pointers in the queue table, namely, tail_ptr and head_ptr. Alternatively, if a counter variable is maintained for each queue in the queue table, that variable can simply be read to determine whether the queue contains any unread messages.

Instead of polling the queue, a service can be provided within the data storage system which automatically sends a notification to a host processor or a process running on the host processor indicating that its queue has an unread message in it.

Note that the communications can be intra host process as well as inter host process. In other words, we are referring to communications between processes which may be on the same or different machines. One advantage of using the queues for intra host communications is that all messages are persistent regardless of whether any of the processes that are a party to the communications continues to be active or terminates. That is, the messages do not go away with the termination of a process on a connected host processor. In other words, it allows the communication of messages between processes to be asynchronous.

FIG. 5 shows a typical sequence of steps for sending a message to a queue. The sending process first issues an open_queue instruction identifying the queue to which the message is to be sent (step 300). This opens the identified queue in the data storage system so that a message can be added to the queue. Next, the accessing process issues an enqueue instruction to add a message to the tail of the open queue (step 302). The process uses a separate enqueue instruction for each message that is to be added to the open queue. When all of the messages have been appended to the queue, the process issues a close_queue instruction to release the queue for use by another process (step 304).

Referring to FIG. 6, a similar sequence of operations is performed when a process retrieves stored messages from a queue. First, the process issues an open_queue instruction to get access to the queue containing the messages that are to be retrieved (step 310). Then, using a dequeue instruction, the process retrieves a message from the open queue (step 312). This is repeated for each message that is retrieved (step 314). To release the queue, the process issues a close_queue instruction (step 316).

Even though we have used the Symmetrix™ integrated cache disk array as an example of the data storage system, this was not meant to be limiting. The data storage system can be any data storage system that allows multiple host processors to connect to it and that permits those multiple connected host processors to share part or all of the data storage that is provided by the system. In general, by a data storage system we mean any system in which digital information can be stored and from which it can be retrieved and which is accessed by using input and output (i.e., I/O) services. This is to be distinguished from what is referred to variously as internal memory, main memory, central memory, or local memory. Internal memory within a host processor, unlike external memory, is directly accessed by communications over an internal bus. The CPU within the host processor directly transfers data to and from main memory; whereas, the CPU uses either a controller or a I/O processor (a.k.a. a data channel) to handle data transfers to or from an external data storage device.

I/O is a well-defined set of services that are typically provided by the operating system. I/O are those services by which data gets into and out of the host processor. Often it implies an I/O channel which is managed by its own I/O processor or controller. The controller handles access to the external data storage device. Programs are loaded into the channel and the channel is instructed to execute the program which handles all of the I/O to and from main memory, while the CPU is free to execute other programs.

We also intend that message be broadly construed to include any data, instruction, or set of data and/or instructions that is sent by one process and is intended for (e.g. addressed to) another process. For example, the invention can be used to send E-mail, to pass data (e.g. transaction data) from one process to the another, or to handle failover within a cluster. In the case of failover, the entire work of one host processor within a cluster, i.e., the failed processor, is passed to another host processor within the cluster so that it can be completed. In addition, the processes may be running on separate host processors or on the same host processor.

Other embodiments are within the following claims.

What is claimed is:

1. A method of transferring messages between a plurality of processors that are connected to a data storage system, wherein the plurality of processors access the data storage system by performing I/O services, said method comprising:

configuring said data storage system to provide a shared data storage area for said plurality of processors, wherein each of said plurality of processors, is permitted to access the shared data storage region;

establishing a plurality of queues within said shared data storage region, each of said queues associated with a corresponding different selected one of said plurality of processors and for receiving and storing messages that are received from other of said plurality of processors and intended for the associated selected one of said plurality of processors;

when a sending processor sends a new message intended for an intended recipient processor, sending said new nessage to said data storage system; and enqueuing said new message in an intended recipient's queue, wherein said intended recipient's queue is one of said plurality of queues, and wherein said sending intended recipient processors are among said plurality of processors.

2. The method of claim 1 further comprising:

dequeuing a message from the intended recipient's queue which contains one or more enqueuing message one of which is the new message; and sending the dequeued message to the intended recipient processor.

3. A method of transferring messages between a plurality of processor that are connected to a data storage system, wherein the plurality of processors access the data storage system by performing I/O services, said method comprising:

configuring said data storage system to provide a shared data stroage area for said plurality of processors, wherein each of said plurality of processors is permitted to access the shared data storage region;

establishing a plurality of queues within said shared data storage region, each of said queues associated with a corresponding different selected one of said plurality of processsors and for storing messages that are received from said plurality of processors and are intended for the associated selected one of said plurality of processors;

dequeuing a message from an intended recipient's queue which contains one or more enqueued messages; and sending the dequeued message to the intended recipient processor, wherein said intended recipient processor is among said plurality of processors.

4. The method of claim 3 further comprising:

when a sending processor sends a new message intended for an intended recipient processor, sending said new message to said data storage system; and enqueuing said new message in the intended recipient's queue, wherein said intended recipient's queue is one of said plurality of queues, and wherein said sending processor is among said plurality of processors.

5. A messaging system comprising:

a data storage system;

a plurality of host processors connected to said data storage system, wherein said plurality of host processors uses I/O services to send data to and retrieve data from said data storage system, wherein said data storage system is configured to provide a data storage area and wherein said data storage system comprises a plurality of queues within said storage are, each of said plurality of queues associated with a corresponding different selected one of said plurality of host processors and for storing messages that are received from said plurality of host processors and are intended for the associated selected one of said plurality of host processors, said messaging system further comprising:

means for enabling another process running one of said plurality of host processors to enqueue a message in a selectable one of said plurality of queues; and means for enabling another process running on another of said plurality of host processors to dequeue an enqueued message from predetermined one of said plurality of queues.

6. The message system of claim 5 wherein said data storage system comprises cache memory and disk memory and wherein said shared storage area is implemented in said cache memory.

* * * * *